United States Patent
Yen et al.

(10) Patent No.: US 7,460,539 B2
(45) Date of Patent: Dec. 2, 2008

(54) INDIVIDUALLY PROGRAMMABLE MOST SIGNIFICANT BITS OF VLAN ID

(75) Inventors: Johnson Yen, Fremont, CA (US); Yi-Hsien Hao, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 852 days.

(21) Appl. No.: 10/814,225

(22) Filed: Apr. 1, 2004

(65) Prior Publication Data

US 2005/0220105 A1 Oct. 6, 2005

(51) Int. Cl.
*H04L 12/28* (2006.01)
(52) U.S. Cl. .................. 370/392; 370/389; 709/238
(58) Field of Classification Search .................. None
See application file for complete search history.

(56) References Cited

U.S. PATENT DOCUMENTS

| | | | |
|---|---|---|---|
| 6,266,705 B1 | 7/2001 | Ullum et al. | |
| 6,384,750 B1 | 5/2002 | Brown | |
| 6,430,188 B1 * | 8/2002 | Kadambi et al. | 370/398 |
| 6,633,567 B1 | 10/2003 | Brown | |
| 6,639,901 B1 * | 10/2003 | Katzri et al. | 370/255 |
| 6,798,775 B1 * | 9/2004 | Bordonaro et al. | 370/392 |
| 7,099,325 B1 * | 8/2006 | Kaniz et al. | 370/392 |

* cited by examiner

*Primary Examiner*—Wing F. Chan
*Assistant Examiner*—Michael J Moore, Jr.
(74) *Attorney, Agent, or Firm*—Squire, Sanders & Dempsey, L.L.P.

(57) ABSTRACT

A network switch that includes an address resolution table and a VLAN table. The address resolution table comprises a VLAN identifier (ARL VID) in less significant bits, a MAC address, and an action code, wherein each VLAN identifier in the address resolution table is unique. The VLAN table is used for storing information related to frame forwarding. The VLAN table includes a VLAN identifier (VLAN VID) in more significant bits, a forward map and an un-tag map. The ARL VID is used to access an associated entry in the VLAN table.

13 Claims, 4 Drawing Sheets

| VID [3:0] - 204 | MAC [47:0] - 206 | Action Code [m:0] - 208 |
|---|---|---|
| 1 | | |
| ... | | |
| 4096 | | |

ARL Table – 202

Figure 2

| VID [11:4] - 304 | Un-tag Map[n:0] - 308 | Forward Map[n:0] - 306 |
|---|---|---|
| 1 | | |
| ... | | |
| 16 | | |

VLAN Table – 302

Figure 3

INDIVIDUALLY PROGRAMMABLE MOST SIGNIFICANT BITS OF VLAN ID

BACKGROUND OF THE INVENTION

1. Field of the Invention

The invention relates to network devices, and in particular, to a method and apparatus for individually programming the most significant bit of a VLAN identifier.

2. Description of the Related Art

A LAN may be configured into multiple logical LANs or Virtual LANs (VLAN) to allow network operators to configure and administer networks as a single entity, while providing users with the connectivity and privacy of multiple separate networks. Further to this objective, the IEEE 802.1Q VLAN standard was created to break larger networks into smaller networks so that network traffic would not capture more bandwidth than necessary. All traffic on a VLAN is sent only to users of that VLAN. Therefore, users not belonging to the VLAN cannot send or receive any traffic to or from users on the VLAN.

To support IEEE 802.1Q VLAN, a current configuration of an Ethernet switch uses a 4,096 entry Address Resolution Table (ARL) and a VLAN table. The ARL table enables the switch to find the destination port(s) for incoming frames. Each ARL entry stores a frame's VLAN ID (VID) in registers (11:0), a frame's MAC address in registers (47:0) and an action code which tells the switch which port(s) to send the frame to in registers (m:0), where m is the size of the action code. The VLAN table is used to store VLAN related information for frame forwarding. Specifically, each VLAN entry stores a VLAN forward map in registers (n:0) and a VLAN un-tag map in registers (n:0), where n is the number of switch ports. The maximum size of each VID is 12 bit and the maximum number of VIDs in the ARL table is 4,096. To support all of the VIDs in the ARL table, the VLAN table also has 4096 entries. The switch uses each VID to access the appropriate entry in the VLAN table.

Upon receiving an incoming frame, the switch obtains the MAC destination address in registers (47:0) and the VID in registers (11:0) from the incoming frame. The incoming frame's MAC destination address in registers (47:0) and the VID in registers (11:0) are hashed to a 12 bit ARL address which is used to access the ARL table. Upon obtaining the appropriate entry in the ARL table, the switch compares the VID in registers (11:0) and MAC address in registers (47:0) in the ARL table with the incoming frame's VID in registers (11:0) and MAC destination address (47:0). If they are the same, then there is an ARL hit and the action code in the ARL table is used to determine which egress port(s) to send the incoming frame to. The incoming frame's VID in registers (11:0) is also used to access the VLAN table and the switch reads the forward map and the un-tag map from the VLAN entry that is associated with the VID. If there was an ARL hit and the ports indicated by the action code in the ARL table are also active in the forward map, then the switch forwards the incoming frame to the identified egress port(s). If there was not a hit in the ARL table, but there was a match in the VLAN table, the switch uses the forward map in the VLAN table to forward the incoming frame to the appropriate destination port(s). If the was not a match in either the VLAN or ARL tables, the switch drops the frame.

It takes a lot of silicon area to accommodate a 4,096 entry VLAN table. Moreover, most systems do not use all of the VID. Therefore, a current configuration uses an ARL table wherein the VID in registers (11:4) is fixed and predefined. In this configuration, the VLAN table includes 16 entries. The less significant bits of the VID, i.e. registers (3:0), are used to index the VLAN table and the most significant bits of the VID are predefined among the switch users and fixed. The drawback to this implementation is that the VID has to be in a continuous VLAN space. For some existing environments, this is difficult to implement.

SUMMARY OF THE INVENTION

In order to overcome the limitations outlined above, the present invention provides a network switch that includes an address resolution table and a VLAN table. The address resolution table comprises a VLAN identifier (ARL VID) in less significant bits, a MAC address, and an action code, wherein each VLAN identifier in the address resolution table is unique. The VLAN table is used for storing information related to frame forwarding. The VLAN table includes a VLAN identifier (VLAN VID) in more significant bits, a forward map and an un-tag map. The ARL VID is used to access an associated entry in the VLAN table.

The present invention also provides a method for forwarding an incoming frame in a network switch. The method includes the steps of upon receiving an incoming frame, converting a MAC destination address and less significant bits of a VID from the incoming frame into a 12 bit ARL address which is used to access an address resolution table and comparing an ARL VID and a MAC address from the address resolution table with the MAC destination address and less significant bits of the VID from the incoming frame to determine if there is an ARL hit. The method also includes the steps of using an action code from the address resolution table to determine at least one egress port to send the incoming frame to if, there is an ARL hit; and using the less significant bits of the VID of the incoming frame to access an appropriate entry in a VLAN table. The method further includes the steps of comparing a VLAN VID from the VLAN table with more significant bits of the VID of the incoming frame, wherein if the VLAN VID is the same as the more significant bits of the VID of the incoming frame, there is a VLAN match; and forwarding the incoming frame to at least one port based on at least one of the ARL hit and the VLAN hit.

The present invention further provides an apparatus for forwarding an incoming frame in a network switch. The apparatus includes a converting means for converting a MAC destination address and less significant bits of a VID from an incoming frame into a 12 bit ARL address which is used to access an address resolution table upon receiving the incoming frame. The apparatus also includes a comparing means for comparing an ARL VID and a MAC address from the address resolution table with the MAC destination address and less significant bits of the VID from the incoming frame to determine if there is an ARL hit. The apparatus further includes means for using an action code in the address resolution table to determine at least one egress port to which the incoming frame is sent, if there is an ARL hit and means for using the less significant bits of the VID of the incoming frame to access an entry in a VLAN table. The apparatus also includes a comparing means for comparing a VLAN VID from the VLAN table with more significant bits of the VID of the incoming frame, wherein if the VLAN VID is the same as the more significant bits of the VID of the incoming frame, there is a VLAN match. The apparatus also includes a forwarding means for forwarding the incoming frame to at least one port based on at least one of the ARL hit and the VLAN hit.

BRIEF DESCRIPTION OF THE DRAWINGS

The objects and features of the invention will be more readily understood with reference to the following description and the attached drawings, wherein:

FIG. 2 illustrates an Address Resolution table that is implemented according to the present invention;

FIG. 3 illustrates a VLAN table that is implemented according to the present invention;

DETAILED DESCRIPTION OF THE PREFERRED EMBODIMENTS

Reference will now be made in detail to the preferred embodiments of the present invention, examples of which are illustrated in the accompanying drawings. The present invention described below extends the functionality of the inventive method for individually programming the most significant bits of each VLAN ID in a VLAN table.

Figure 1:
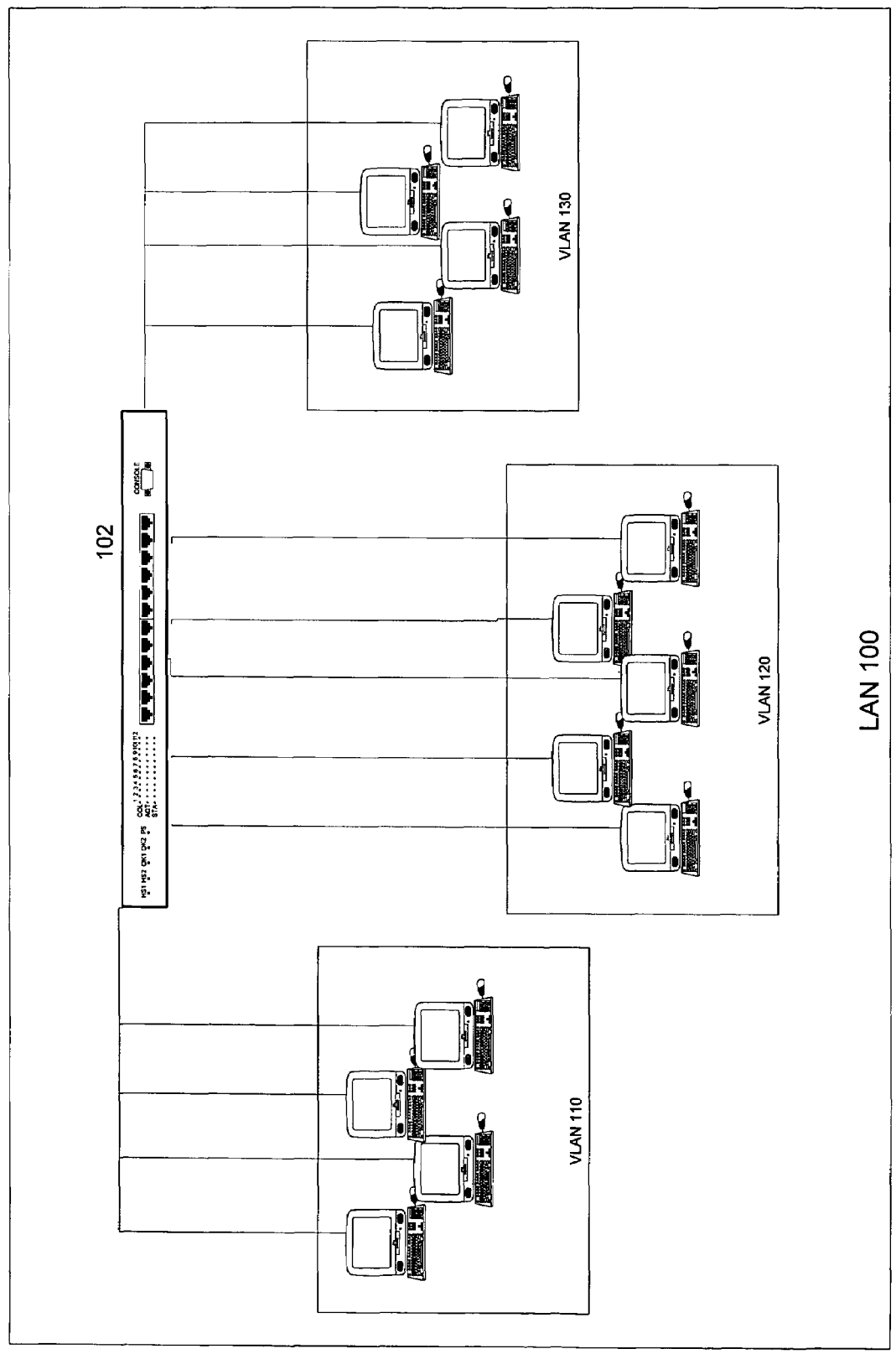
FIG. 1 illustrates a configuration of a LAN which includes desktop stations that are divided into four VLANS.

FIG. 1 illustrates a configuration of a Local Area Network (LAN) 100 which includes a switch 102 and desktop stations that are divided into three logical groups 110, 120 and 130, such that each member of a group can communicate with other members of the group but cannot access data or communicate with members of other groups. In one embodiment, the present invention provides a flexible Virtual LAN (VLAN) configuration that allows any number of VLAN combinations, such that each logical group 110, 120 and 130 can be configured into VLANs 110, 120 and 130.

Any switch port can be grouped into a particular VLAN, for example VLAN 110, by programming the appropriate VLAN control registers. To associate switch ports with VLANs 110, 120 and 130, LAN 100 includes an array of registers that corresponds to associated ingress ports. Thereafter, for each packet received in a switch on LAN 100, an Address Resolution Table (ARL) resolves the Destination Address and obtains a forwarding vector for the associated egress port(s). Then the ARL applies a VLAN filter from the VLAN register associated with the ingress port to this forwarding vector which masks out ports not contained in this VLAN. This allows LAN 100 to forward packets only to those ports specified in the VLAN forwarding register and to blocks the packet from all other ports.

Specifically Ethernet data for a user on a VLAN arrive at one of the ports on LAN 100. When the data packet is received, an ingress sub-module, as an ingress function, determines the destination of the packet. The first 64 bytes of the data packet is buffered by the ingress sub-module and compared to data stored in the lookup tables to determine the destination port(s). Also as an ingress function, the ingress sub-module slices the data packet into a number of 64-byte cells. It should be noted that one or more components of LAN 100 may have an ingress submodule and egress submodule which provide port specific ingress and egress functions. All incoming packet processing occurs in the appropriate ingress submodule and features such as the fast filtering processor, layer two (L2) and layer three (L3) lookups, layer two learning, layer two table management, layer two switching, packet slicing, and channel dispatching occur in the ingress submodule. After lookups, fast filter processing, and slicing into cells the packet is placed from ingress submodule into a dispatch unit and then placed onto a CPS channel. A number of ingress buffers are provided in the dispatch unit to ensure proper handling of the packets/cells. The egress submodule monitors the CPS channel and continuously looks for cells destined for a port of a particular Ethernet Port Interface Controller (EPIC). When a Pipelined Memory Management Unit (PMMU) receives a signal that an egress submodule associated with a destination of a packet in memory is ready to receive cells, the PMMU pulls the cells associated with the packet out of the memory and places the cells on a CPS channel, destined for the appropriate egress submodule. A FIFO in the egress submodule continuously sends a signal onto the CPS channel that it is ready to receive packets, when there is room in the FIFO for packets or cells to be received. Cells of a particular packet are always handled together to avoid corrupting of packets. Once the identity of the user at the ingress port is determined, ARL/L3 tables are updated to reflect the user identification. The ARL/L3 tables of each other EPIC are updated to reflect the newly acquired user identification in a synchronizing step.

An ARL engine in LAN 100 reads the packet; if the packet has a VLAN tag according to IEEE Standard 802.1q, then the ARL engine performs a look-up based upon a tagged VLAN table, which is part of a VLAN table. If the packet does not contain this tag, then the ARL engine performs VLAN lookup based upon the port based VLAN table. Once the VLAN is identified for the incoming packet, the ARL engine performs an ARL table search based upon the source MAC address and the destination MAC address. If the result of the destination search is an L3 interface MAC address, then an L3 search is performed of an L3 table within an ARL/L3 table. If the L3 search is successful, then the packet is modified according to packet routing rules.

If a data packet is sent from a source station A into a port, and destined for a destination station B on another port associated with the same EPIC, the ingress submodule slices the data packet into cells. The ingress submodule then reads the packet to determine the source MAC address and the destination MAC address. The ingress submodule, in particular a ARL engine, performs the lookup of appropriate tables within ARL and VLAN tables, to see if the destination MAC address exists in ARL/L3 tables; if the address is not found, but if the VLAN IDs are the same for the source and destination, then the ingress submodule will set the packet to be sent to all ports. The packet will then propagate to the appropriate destination address. A "source search" and a "destination search" occurs in parallel. Concurrently, the source MAC address of the incoming packet is "learned", and therefore added to an ARL table. After the packet is received by the destination, an acknowledgement is sent by destination station B to source station A. Since the source MAC address of the incoming packet is learned by the appropriate table of B, the acknowledgement is appropriately sent to the port on which A is located. When the acknowledgement is received at the port therefore, the ARL table learns the source MAC address of B from the acknowledgement packet.

FIG. 2 illustrates an ARL table 202 implemented in an embodiment of the invention wherein each switch in the network includes a 4,096 entry ARL table 202. Each entry in ARL table 202 stores a frame's VLAN ID (VID) 204 in registers (3:0), a frame's MAC address 206 in registers (47:0) and an action code 208, in registers (m:0), which tells the switch which port(s) to send the frame to, wherein m is the size of the action code. Each VID 204 in ARL table 202 must have a unique value to properly access an associated entry in the VLAN table 302.

FIG. 3 illustrates a VLAN table 302 that can reside in the internal embedded memory of a switch. Each entry in VLAN table 302 is used to store VLAN related information for frame forwarding. Each entry in VLAN table 302 stores a VID 304 in registers (11:4), a forward map 306 in registers (n:0) and a VLAN un-tag map 308 in registers (n:0), where n is the number of switch ports. VID 304 may be any value, forward map 306 defines the membership within a VLAN domain and un-tag map 308 controls whether the egress packet is tagged or untagged.

To forward an incoming frame to the appropriate port(s), the switch obtains the MAC destination address in registers (47:0) and the VID in registers (11:0) from the incoming frame. The MAC destination address in registers (47:0) and the VID in registers (11:0) can be hashed to a 12 bit ARL address which is used to access the appropriate entry in the ARL table 202. The switch compares the VID 204 in registers (3:0) and MAC address 206 in registers (47:0) of ARL table 202 with the incoming frame's VID in registers (3:0) and MAC destination address in registers (47:0). If they are the same, then there is an ARL hit and action code 208 is used to determine which egress port(s) to send the incoming frame to. The incoming frame's VID (3:0) is also used to access an appropriate entry in VLAN table 302. The switch compares the VID 304 in registers (11:4) with the incoming frame's VID in registers (11:4). If the VIDs in registers (11:4) of the incoming frame and VLAN table 302 are the same, then there is a VLAN match. If there is a VLAN match and an ARL hit, and if the egress port(s) indicated by action code 208 is active in VLAN forward map 308, then the switch forwards the frame to the identified egress port(s). If there was not a hit between ARL table 202 and the incoming frame, but there was a match in VLAN table 302, then the switch uses the information in forward map 308 to forward the incoming frame to the appropriate port(s). If there is not a match in either the VLAN 210 or ARL tables 202, the switch drops the frame.

Figure 4:
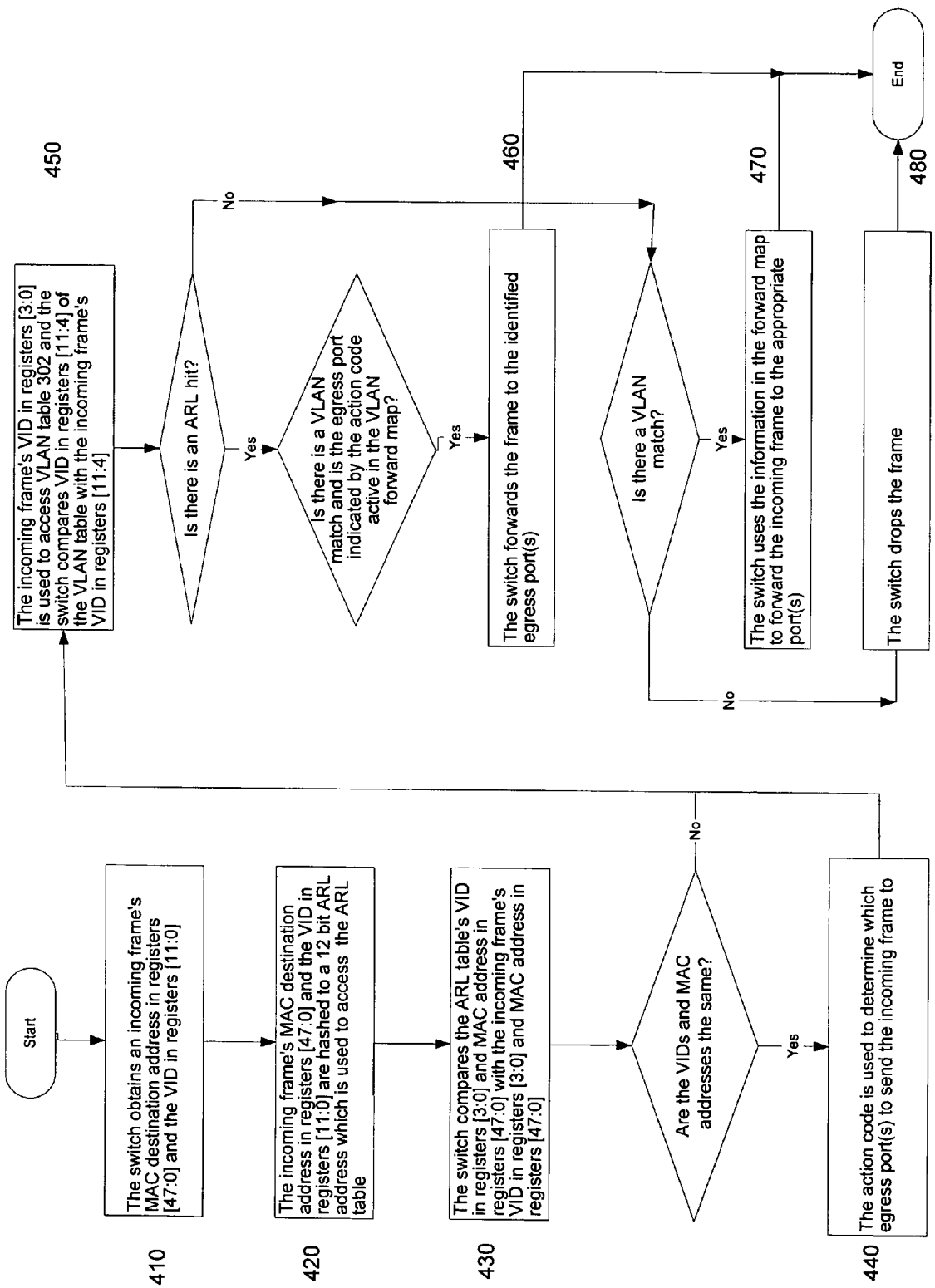
FIG. 4 illustrates the steps implemented in the present invention.

FIG. 4 illustrates one example of the steps implemented in the preferred embodiment of the invention. In Step 410, the switch obtains an incoming frame's MAC destination address in registers (47:0) and the VID in registers (11:0). In Step 420, the incoming frame's MAC destination address in registers (47:0) and the VID in registers (11:0) can be hashed to a 12 bit ARL address which is used to access ARL table 202. In Step 430, the switch compares VID 204 in registers (3:0) and MAC address 206 in registers (47:0) with the incoming frame's VID in registers (3:0) and MAC address in registers (47:0). If they are the same, in Step 440, action code 208 is used to determine which egress port(s) to send the incoming frame to. In Step 450, the incoming frame's VID in registers (3:0) is used to access VLAN table 302 and the switch compares VID 304 in registers (11:4) with the incoming frame's VID in registers (11:4). In Step 460, if there is a VLAN match and an ARL hit, and if the egress port(s) indicated by action code 208 is active in VLAN forward map 306, then the switch forwards the frame to the identified egress port(s). If there was not a hit between ARL table 202 and the incoming frame, but there was a match in VLAN table 210, in Step 470, the switch uses the information in forward map 214 to forward the incoming frame to the appropriate port(s). If there is not a match in either the VLAN 210 or ARL tables 202, in Step 480, the switch drops the frame.

Figure 5:
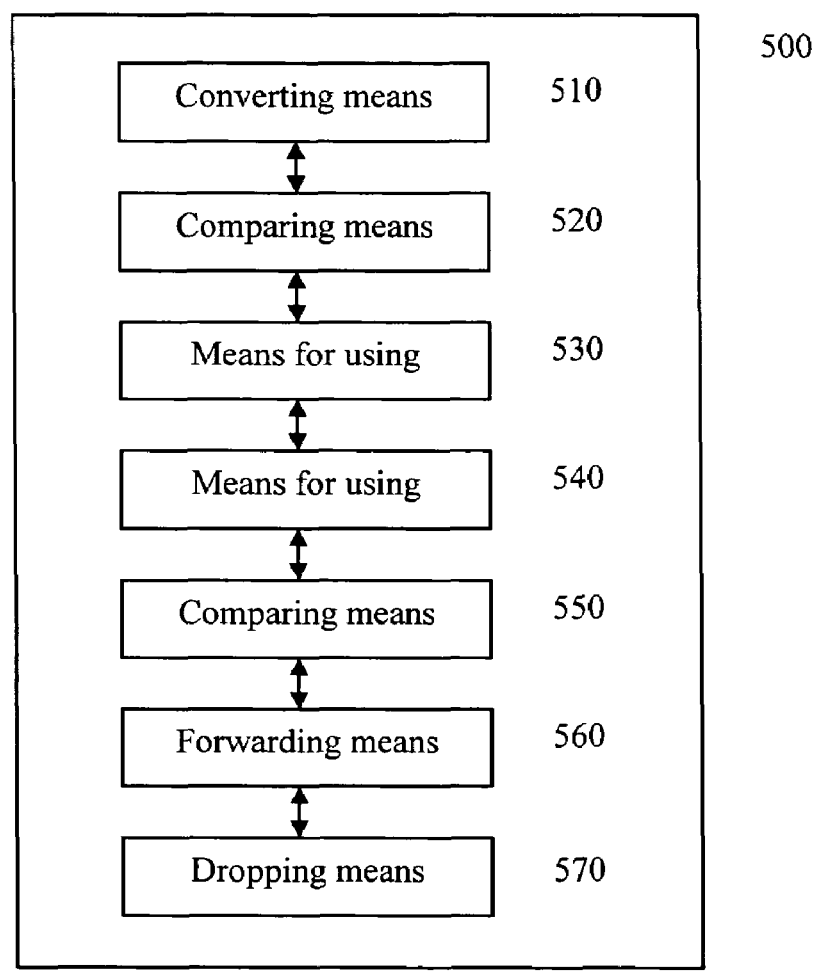
FIG. 5 illustrates an apparatus for forwarding an incoming frame in a network switch according to the present invention.

FIG. 5 illustrates an apparatus 500 for forwarding an incoming frame in a network switch, in accordance with an embodiment of the present invention. The apparatus 500 includes converting means 510 for converting a MAC destination address and less significant bits of a VLAN identifier (VID) from an incoming frame into a 12 bit address resolution table (ARL) address which is used to access an address resolution table upon receiving the incoming frame. The apparatus 500 also includes comparing means 520 for comparing an ARL VID and a MAC address from the address resolution table with the MAC destination address and less significant bits of the VID from the incoming frame to determine if there is an ARL hit. If there is an ARL hit, the apparatus 500 includes means 530 for using an action code in the address resolution table to determine at least one egress port to which the incoming frame is sent. The apparatus 500 further includes means 540 for using the less significant bits of the VID of the incoming frame to access an entry in a VLAN table. The apparatus 500 includes comparing means 550 for comparing a VLAN VID from the VLAN table with more significant bits of the VID of the incoming frame. If the VLAN VID is the same as the more significant bits of the VID of the incoming frame, there is a VLAN match. The apparatus 500 includes forwarding means 560 for forwarding the incoming frame to at least one port based on at least one of the ARL hit and the VLAN match. The apparatus also includes dropping means 570 for dropping the incoming frame if there is not a VLAN match and there is not an ARL hit.

Although the invention has been described based upon these preferred embodiments, it would be apparent to those of skilled in the art that certain modifications, variations, and alternative constructions would be apparent, while remaining within the spirit and scope of the invention. For example, the specific configurations of packet flow are discussed with respect to a switch configuration such as that of Soc 10. It should be noted, however, that other switch configurations could be used to take advantage of the invention. In order to determine the metes and bounds of the invention, therefore, reference should be made to the appended claims.

The invention clamed is:

1. A method for forwarding an incoming frame in a network switch, the method comprising:
    upon receiving an incoming frame, converting a MAC destination address and less significant bits of a VLAN identifier (VID) from the incoming frame into a 12 bit address resolution table (ARL) address which is used to access an address resolution table;
    comparing an ARL VID and a MAC address from the address resolution table with the MAC destination address and less significant bits of the VID from the incoming frame to determine if there is an ARL hit;
    if there is an ARL hit, using an action code from the address resolution table to determine at least one egress port to which the incoming frame is sent;
    using the less significant bits of the VID of the incoming frame to access an appropriate entry in a VLAN table;
    comparing a VLAN VID from the VLAN table with more significant bits of the VID of the incoming frame, wherein if the VLAN VID is the same as the more significant bits of the VID of the incoming frame, there is a VLAN match; and
    forwarding the incoming frame to at least one port based on at least one of the ARL hit and the VLAN match.

2. The method of claim 1, wherein the step of forwarding the incoming frame further comprises the step of forwarding the incoming frame to at least one indicated egress port if there is a VLAN match and an ARI hit and if the at least one egress port indicated by the action code is active in a forward map in the VLAN table.

3. The method of claim 1, wherein the step of forwarding the incoming frame further comprises the step of using a forward map entry in the VLAN table to determine where to forward the incoming frame if there is a VLAN match and there is not an ARL hit.

4. The method of claim 1, further comprising the step of dropping the incoming frame if there is not a VLAN match and there is not an ARL hit.

5. An apparatus for forwarding an incoming frame in a network switch, the apparatus comprises:
   converting means for converting a MAC destination address and less significant bits of a VLAN identifier (VID) from an incoming frame into a 12 bit address resolution table (ARL) address which is used to access an address resolution table upon receiving the incoming frame;
   comparing means for comparing an ARL VID and a MAC address from the address resolution table with the MAC destination address and less significant bits of the VID from the incoming frame to determine if there is an ARL hit;
   if there is an ARE hit, means for using an action code in the address resolution table to determine at least one egress port to which the incoming frame is sent;
   means for using the less significant bits of the VID of the incoming frame to access an entry in a VLAN table;
   comparing means for comparing a VLAN VID from the VLAN table with more significant bits of the VID of the incoming frame, wherein if the VLAN VID is the same as the more significant bits of the VID of the incoming frame, there is a VLAN match; and
   forwarding means for forwarding the incoming frame to at least one port based on at least one of the ARL hit and the VLAN match.

6. The apparatus of claim 5, wherein the forwarding means further comprises means for forwarding the incoming frame to at least one indicated egress port if there is a VLAN match and an ARL hit and if the at least one egress port indicated by the action code is active in a forward map in the VLAN table.

7. The apparatus of claim 5, wherein the forwarding means further comprises means for forwarding the incoming frame if there is a VLAN match and there is not an ARL hit, wherein a forward map entry in the VLAN table is used to determine where to forward the incoming frame.

8. The apparatus of claim 5, further comprising dropping means for dropping the incoming frame if there is not a VLAN match and there is not an ARL hit.

9. The apparatus of claim 5, wherein:
   the address resolution table comprises the VLAN identifier (ARL VID) in less significant bits, the MAC address, and the action code, wherein each ARL VID is unique; and
   the VLAN table stores information related to frame forwarding and comprises the VLAN identifier (VLAN VID) in more significant bits, a forward map and an un-tag map,
   wherein the ARL VID is used to access an associated entry in the VLAN table.

10. The apparatus of claim 9, wherein a determining component uses the action code to determine a network port to which an incoming frame is sent.

11. The apparatus of claim 9, wherein the VLAN table further comprises a table with the VLAN VID that may be any value, a table with at least one forward map which defines membership with a VLAN domain, and a table with at least one un-tag map which controls whether an egress packet is tagged or untagged.

12. The apparatus of claim 9, wherein upon receiving an incoming frame, the converting means hashes the MAC destination address and less significant bits of the VID from the incoming frame into a 12 bit ARL address which is used to access the address resolution table.

13. The apparatus of claim 9, further comprising accessing means for using the less significant bits of the VID of the incoming frame to access the VLAN table and means for comparing the VLAN VID with more significant bits of the VID of the incoming frame, wherein if the VLAN VID is the same as the more significant bits of the VID of the incoming frame, there is a VLAN match.

* * * * *

UNITED STATES PATENT AND TRADEMARK OFFICE
CERTIFICATE OF CORRECTION

PATENT NO. : 7,460,539 B2
APPLICATION NO. : 10/814225
DATED : December 2, 2008
INVENTOR(S) : Johnson Yen and Yi-Hsien Hao It is certified that error appears in the above-identified patent and that said Letters Patent is hereby corrected as shown below:

In Column 6, Claim 2, line 63, after "an" delete "ARI" and insert --ARL--.
In Column 7, Claim 5, line 20, after "if there is an" delete "ARE" insert --ARL--.

Signed and Sealed this

Twelfth Day of October, 2010

David J. Kappos
*Director of the United States Patent and Trademark Office*